(12) United States Patent
Black et al.

(10) Patent No.: US 9,991,711 B2
(45) Date of Patent: Jun. 5, 2018

(54) AUTOMATED VOLTAGE SUPPORT FROM LOAD RESOURCES

(71) Applicant: Battelle Memorial Institute, Columbus, OH (US)

(72) Inventors: Jason W. Black, Dublin, OH (US); Eric Rehberg, Westerville, OH (US); Jason McCullough, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 241 days.

(21) Appl. No.: 14/976,764

(22) Filed: Dec. 21, 2015

(65) Prior Publication Data

US 2016/0181815 A1 Jun. 23, 2016

Related U.S. Application Data (60) Provisional application No. 62/095,613, filed on Dec. 22, 2014.

(51) Int. Cl.
| H02J 4/00 | (2006.01) |
| H02J 3/14 | (2006.01) |
| H02J 3/12 | (2006.01) |
| F24H 9/20 | (2006.01) |

(52) U.S. Cl.
CPC .............. *H02J 3/14* (2013.01); *F24H 9/2014* (2013.01); *H02J 3/12* (2013.01); *Y02B 70/3225* (2013.01); *Y02B 70/3275* (2013.01); *Y04S 20/222* (2013.01); *Y04S 20/244* (2013.01)

(58) Field of Classification Search
CPC combination set(s) only.
See application file for complete search history.

(56) References Cited

U.S. PATENT DOCUMENTS

| 9,755,419 B2 * | 9/2017 | Luciani | H02H 3/10 |
| 2014/0268458 A1 * | 9/2014 | Luciani | H02H 3/10 361/86 |
| 2016/0233677 A1 * | 8/2016 | Douglass | H02J 3/14 |

OTHER PUBLICATIONS

Fanney et al.; The Thermal Performance of Residential Electric Water Heaters Subjected to Various Off-Peak Schedules; Journal of Solar Energy Engineering; vol. 118; pp. 73-80; 1996.

(Continued)

*Primary Examiner* — An Luu (74) *Attorney, Agent, or Firm* — Richard M. Klein; Fay Sharpe LLP (57) ABSTRACT

Loads on a distribution circuit are operated, which causes the loads to consume electricity delivered to the loads via the distribution circuit. A circuit voltage of the distribution circuit is measured. An excursion of the measured circuit voltage outside of a normal operating voltage range is responded to by triggering a sub-set of the loads on the distribution circuit to increase or decrease their power draw to counter the excursion. For an overvoltage condition, the responding comprises triggering a sub-set of the loads on the distribution circuit to operate, or increase their power draw, in order to reduce the circuit voltage. For an undervoltage condition, the responding comprises triggering a sub-set of the loads on the distribution circuit to cease operating, or reduce their power draw, in order to increase the circuit voltage.

21 Claims, 6 Drawing Sheets

(56) References Cited

OTHER PUBLICATIONS

Vrettos et al.; Load Frequency Control by Aggregations of Thermally Stratified Electric Water Heaters; Innovative Smart Grid Technologies (ISGT Europe); 2012.
Koch, S.; Demand Response Methods for Ancillary Services and Renewable Energy Integration in Electric Power Systems; Dipl.-Ing., University of Stuttgart; Diss. No. 20470; 2012.

* cited by examiner

| Parameter | Description |
|---|---|
| $P_{max}$ | :Maximum load power draw |
| $V_{on}$ | :Circuit overvoltage to trigger O-TVC |
| $\Delta t_{on}$ | :Delay to start power draw ramp-up |
| $R_{on}$ | :Power draw ramp-up rate |
| $V_{off}$ | :Circuit voltage to terminate O-TVC |
| $\Delta t_{off}$ | :Delay to start power draw ramp-down |
| $R_{off}$ | :Power draw ramp-down rate |

AUTOMATED VOLTAGE SUPPORT FROM LOAD RESOURCES

This application claims the benefit of U.S. Provisional Application No. 62/095,613 filed Dec. 22, 2014 and titled "AUTOMATED VOLTAGE SUPPORT FROM LOAD RESOURCES". U.S. Provisional Application No. 62/095,613 filed Dec. 22, 2014 is incorporated herein by reference in its entirety.

BACKGROUND

The following relates to the voltage regulation arts, power system arts, and related arts.

Conventional electrical power grids in the United States, Europe, and many other countries is maintained as a constant voltage system, in which electrical outlets in a home or business are expected to have a certain voltage. For example, in the United States the expected voltage is usually 110 $V_{rms}$ (typical in residential house electricity) or 220 $V_{rms}$ (typical in commercial and some residential environs). In most of Europe the expected voltage is 220 $V_{rms}$. (Hereinafter, when not indicated voltages are root-mean-square, i.e. rms, values). In a per-unit nomenclature, the expected voltage is suitably designated 1.00 pu.

In practice, the voltage may deviate from the expected 1.00 pu value, typically due to a mismatch between power generation and demand. For a given power generation level, when the demand is lower than expected the voltage increases, leading to an overvoltage condition. When the demand is higher than expected the voltage decreases, leading to an undervoltage condition. Some such variation is tolerable, and loads typically have power supplies or power regulation circuitry to compensate for some input voltage deviation. However, if the overvoltage or undervoltage condition becomes too severe it can have adverse effects such as degrading load operational efficiency, causing loads to fail due to the supply voltage falling out of operational range, tripping a safety interlock, or so forth. At the grid level, voltage is typically managed from the generation side by adding or reducing generation capacity to maintain grid voltage, although various demand side load (DSL) management approaches are also known.

Voltage fluctuations can also occur at the distribution level, for example due to additional loads coming online or taken offline so as to significantly change the total load being served by an individual feeder circuit. These distribution-level fluctuations are more difficult to correct.

BRIEF SUMMARY

In some illustrative embodiments disclosed as illustrative examples herein, a system comprises: electricity consuming loads; a distribution circuit connected with the loads to deliver electricity from a feeder head of the distribution circuit to the loads; and load controllers connected with respective loads. Each load controller comprises a microprocessor or microcontroller programmed to (1) operate the connected load and (2) cause the load to execute a voltage support response curve of power draw versus time in response to a circuit voltage excursion outside of a normal operating circuit voltage range. Each voltage support response curve has parameters including at least (1) a trigger voltage defining a circuit voltage threshold that triggers execution of the voltage support response curve and (2) a release voltage defining a circuit voltage threshold that terminates execution of the voltage support response curve. The trigger voltages of the voltage support response curves of the load controllers are different for different load controllers, and are configured to add increasing aggregate load providing voltage support as the circuit voltage excursion increases in magnitude.

In some illustrative systems as set forth in the immediately preceding paragraph, the voltage support response curve comprises an overvoltage response curve in which execution of the overvoltage response curve is triggered when the circuit voltage rises above the trigger voltage, execution of the overvoltage response curve causes the load to turn on or increase power draw, and execution of the overvoltage response curve is terminated when the circuit voltage falls below the release voltage. In some illustrative systems as set forth in the immediately preceding paragraph, the voltage support response curve comprises an undervoltage response curve in which execution of the undervoltage response curve is triggered when the circuit voltage falls below the trigger voltage, execution of the undervoltage response curve causes the load to turn off or reduce power draw, and execution of the undervoltage response curve is terminated when the circuit voltage rises above the release voltage.

In some illustrative embodiments disclosed as illustrative examples herein, a method comprises: operating loads on a distribution circuit wherein the operating causes the loads to consume electricity delivered to the loads via the distribution circuit; measuring a circuit voltage of the distribution circuit; and responding to an excursion of the measured circuit voltage outside of a normal operating voltage range by triggering a sub-set of the loads on the distribution circuit to increase or decrease their power draw to counter the excursion. The excursion may comprise an overvoltage condition in which case the responding comprises triggering a sub-set of the loads on the distribution circuit to operate, or increase their power draw, in order to reduce the circuit voltage. The excursion may comprise an undervoltage condition in which case the responding comprises triggering a sub-set of the loads on the distribution circuit to cease operating, or reduce their power draw, in order to increase the circuit voltage.

In some illustrative methods as set forth in the immediately preceding paragraph, the operating comprises using load controllers of the loads to operate the loads, and the responding comprises triggering the load controllers of the sub-set of the loads to execute voltage support response curves in accordance with parameters of the voltage support response curves stored at the respective load controllers to cause the loads of the sub-set to increase or decrease their power draw as a function of time to counter the excursion. In some such methods, the parameters include a voltage trigger parameter defining a circuit voltage threshold triggering execution of the voltage support response curve, and the different load controllers store different values of the voltage trigger parameter whereby the responding includes increasing the sub-set as the voltage excursion increases in magnitude.

DETAILED DESCRIPTION

Figure 1:
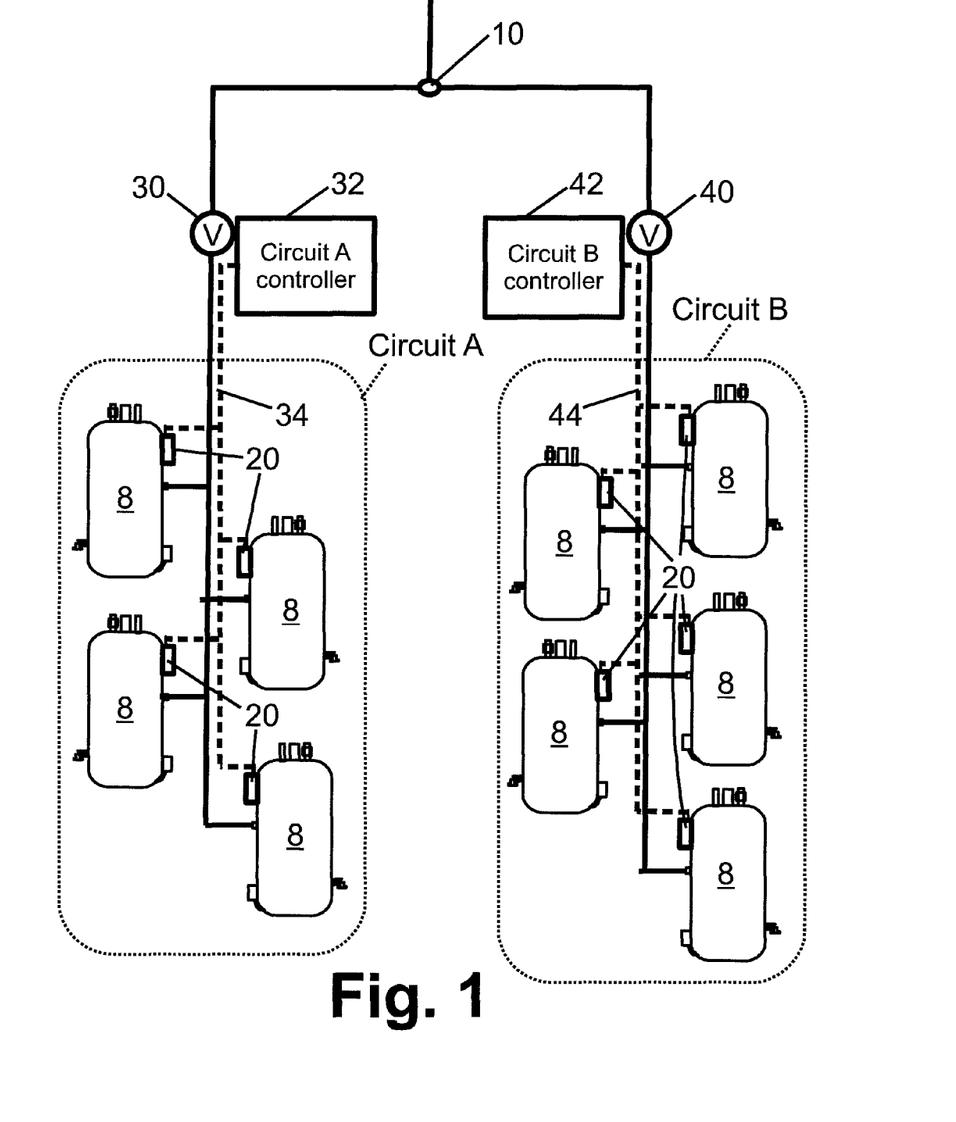
FIG. 1 diagrammatically shows a portion of a power distribution system including automatic voltage support components as disclosed herein.

With reference to FIG. 1, a portion of a power distribution system is shown. Distribution circuit A supplies power to four illustrative loads in the form of water heaters 8. Distribution circuit B supplies power to five illustrative loads, again in the form of water heaters 8. The two circuits A and B may, in general, be three-phase circuits or single-phase circuits, or some combination thereof (e.g. circuit A being a three-phase circuit and circuit B being a single-phase circuit). The illustrative two circuits A and B are tied together at an upstream junction 10, which may be a distribution box, sub-station, or any other electrical distribution system junction. The illustrative loads are water heaters, but more generally the circuits can supply electrical power to various loads or combinations of loads (water heaters, air conditioners, dishwashers, and so forth) and may have various branching configurations or other topologies.

Figure 2:
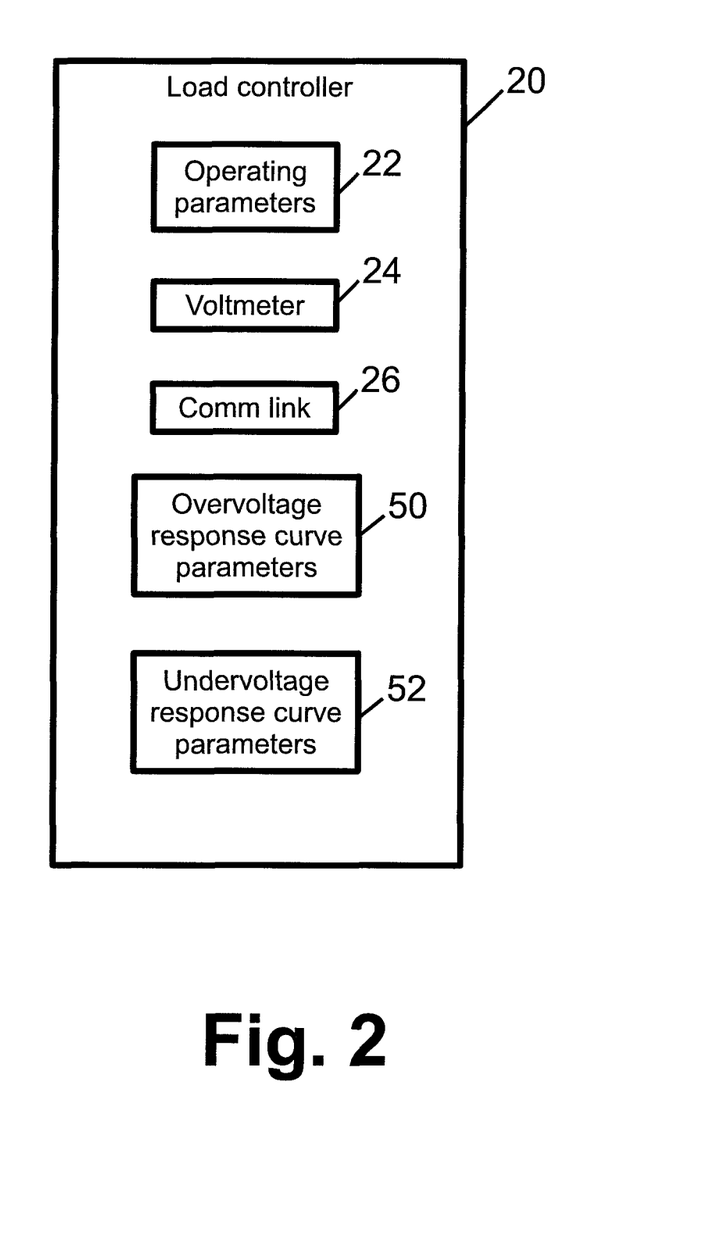
FIG. 2 diagrammatically shows on of the load controllers of the system of FIG. 1.

With continuing reference to FIG. 1 and with further reference to FIG. 2, each load 8 includes a load controller 20 comprising an electronic data processing device, for example a microcontroller or microprocessor in operative connection with non-transitory data storage memory storing executable instructions and configuration parameters. FIG. 2 diagrammatically shows components of an illustrative one load controller 20, which include stored operating parameters 22. For example, in the case of a water heater the operating parameters 22 may include a temperature set point and a dead band temperature range defined respective to the temperature set point. In operation, the water heater operates to heat water when the temperature is below the bottom of the dead band range, does not operate when the temperature is above the top of the dead band range, and maintains its current operating state (heating or not heating) when in the dead band range. This illustrative control approach provides hysteresis and improved energy efficiency as compared with (by way of another example) operating whenever the temperature is below the temperature set point and turning off when the temperature reaches the set point. The operating parameters 22 may be hard-coded into the software or firmware of the load controller 20, or may be user-configurable. For example, in some embodiments the dead band is hard coded while the set point is user-configurable.

With continuing reference to FIGS. 1 and 2, in order to provide voltage support for the distribution circuit, the load controller 20 measures or receives measurements of the circuit voltage. In one approach, the load controller includes a voltmeter 24 to measure the circuit voltage locally, that is, at the controlled load. This approach is appropriate if the distribution circuit is sufficiently limited in scope so that a local voltage measurement is a reasonable "average" of the circuit voltage. Additionally or alternatively, the load controller 20 may include a communication link 26 via which measurements of the circuit voltage are received. With reference to FIG. 1, in one suitable approach the voltage at the feeder head of distribution circuit A is monitored by a voltmeter 30, and a circuit A controller 32 comprises an electronic data processing device (e.g., combination of a computer with wireless communication capability and an analog-to-digital converter, or so forth) that digitizes circuit A voltage samples which are communicated to the communication links 26 of the load controllers 20 of the loads 8 on circuit A via a circuit A communication medium 34. This communication medium 34 may for example be a power line communication (PLC) link, a Bluetooth or other localized wireless communication pathway, a WiFi network, or so forth. In similar fashion, the voltage at the feeder head of distribution circuit B is monitored by a voltmeter 40, and a circuit B controller 42 comprises an electronic data processing device (e.g., combination of a computer with wireless communication capability and an analog-to-digital converter, or so forth) that digitizes circuit B voltage samples which are communicated to the communication links 26 of the load controllers 20 of the loads 8 on circuit B via a circuit B communication medium 44. For illustrative convenience, the communications media 34, 44 are diagrammatically indicated in FIG. 1 using dashed lines to distinguish from the power lines of circuits A and B which are shown in solid lines. It is also contemplated to include both a local voltmeter 24 and a communication link 34 in each load controller 20. For example, the local voltmeter may be used to monitor local voltage while the communication link 34 may be variously used to acquire a feeder head voltage, or local voltages from other loads (a "swarm" approach, where the voltages may be averaged to generate a representative voltage on the circuit), or so forth. The communication link 34 may also be used for remote control of the loads, for example in a demand response system, and/or for remote configuration of the load controllers, and/or for remote monitoring of the loads, or so forth.

Each load controller 20 further includes the capability to respond to an overvoltage condition by adding its load to the circuit (if it is not already operating) so as to reduce the voltage on the distribution circuit, or conversely to respond to an undervoltage condition by removing its load from the circuit (if it is currently operating at the time of the undervoltage condition) so as to increase the voltage. However, as disclosed herein this adding or shedding of load is done in a designed manner on the basis of parameterized overvoltage (or undervoltage) response curves for each load on the circuit, which are designed by suitable selection of the response curve parameters in order to add (or shed) an increasing amount of load as the overvoltage (or undervoltage) condition becomes more pronounced. This enables the loads on the distribution circuit to act in a collective fashion to alleviate the overvoltage (or undervoltage) condition without requiring either centralized control or intercommunication amongst the loads (although such communication is optionally employed during configuration of the response curve parameters). To this end, each load controller further stores overvoltage response curve parameters 50 for the overvoltage response curve of the load, and undervoltage response curve parameters 52 for the undervoltage response curve of the load.

In general, the response curve parameters are not the same for each load on the distribution circuit, and may be dynamically updated to account for changes in the distribution circuit (e.g. addition or removal of loads). In this way, the loads operate in accordance with their respective response curves to enable tailored management of the voltage profile across the distribution circuit/feeder. The overvoltage response curves of some or all loads are invoked to respond to an overvoltage condition, while the undervoltage response curves of some or all loads are invoked to respond to an undervoltage condition, so as to provide automated response to voltage fluctuations. The response curves are optionally set so as to ramp up or down the appropriate amount of aggregated load to ensure the overall distribution circuit voltage satisfies operational constraints. This (by way of illustrative example) allows for management of voltages in the presence of high levels of distributed solar of other variable assets on the distribution level, and optionally is coordinated with Distribution Automation and Voltage (DAV) optimization systems to allow optimal operation of distribution circuits.

As an example, consider a distribution circuit that is to be maintained between 0.95 pu and 1.05 pu to ensure that all loads on the feeder are maintained within the voltage requirements. Each load on the distribution circuit may have an overvoltage response curve configured by its parameters 50 to turn on when the circuit voltage is between 1.02 and 1.05 pu and may have an undervoltage response curve configured by its parameters 52 to turn off when the circuit voltage is between 0.92 to 0.95 pu. The precise turn-on and turn-off voltages may, for example, depend on the location of the load relative to the feeder head, the load power consumption, and other factors such as the behavior of other loads, the aggregate load, i.e. distributed energy resource (DER) on the feeder, the feeder configuration, and so forth. By staggering the response curves so as to adjust for variations in voltage across the feeder, as well as to ramp up/down the load response over time, the aggregated loads can be made to operate to maintain the voltages across the feeder within acceptable bounds. For instance, several loads can be set to have varying response times when the voltage at the feeder head reaches a particular point (e.g. 0.95 pu). In this way, the load response can be proportionally controlled along with the ramp speed at which the loads change. When the feeder has returned to an acceptable voltage value, the responding loads can either return to normal operations automatically after a specified time period (e.g. 5 minutes) has elapsed, or in response to reaching a specific voltage (e.g. a release voltage of 0.99 pu by way of illustrative example). Optionally, the response curves can be adjusted to incorporate them into conservation voltage reduction (CVR), volt var control (VVC), volt var optimization (VVO), or other schemes, feeder reconfigurations, or other distribution automation, either in direct support of these schemes, or as augmentation to adjust for load/distributed generation (DG) variability within a VVO operational period.

Figure 3:
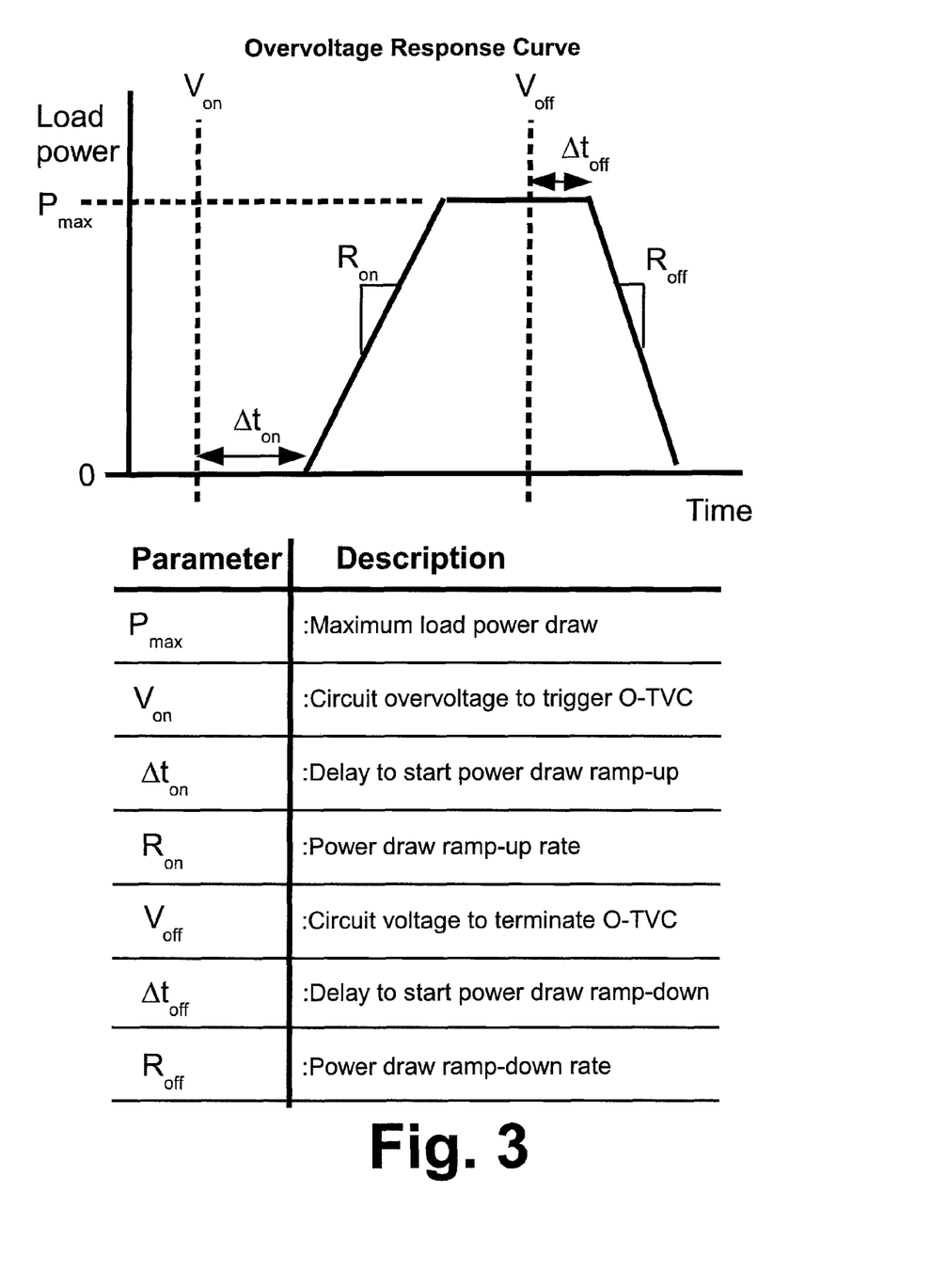
FIG. 3 diagrammatically shows an overvoltage response curve for a load of the power distribution system of FIG. 1.

With reference to FIG. 3, an illustrative embodiment of an overvoltage response curve is shown in the upper portion, with the parameters of the overvoltage response curve tabulated in the lower portion of FIG. 3. The overvoltage response curve is invoked when the circuit voltage (as measured by the voltmeter 24 or received via the communication link 26) exceeds a voltage $V_{on}$, which is a configurable parameter of the overvoltage response curve. There is then an optional configurable delay $\Delta t_{on}$ before onset of bringing the load online, and the load is optionally ramped up at a configurable ramp rate $R_{on}$ until the load reaches its maximum power draw $P_{max}$ (which is typically not configurable, but corresponds to the maximum rated draw of the load). Thereafter, the load continues to draw power at its maximum level $P_{max}$ in order to alleviate the overvoltage condition, until the voltage decreases below a voltage level $V_{off}$, which is again a configurable parameter. After an optional configurable delay $\Delta t_{off}$, the power then optionally ramps down at a configurable ramp rate $R_{off}$. The configurable overvoltage response curve parameters 50 for this embodiment thus include: $V_{on}$, $V_{off}$, $\Delta t_{on}$, $\Delta t_{off}$, $R_{on}$, and $R_{off}$, with $P_{max}$ being a load-dependent parameter that is typically not configurable. It is contemplated to configure $\Delta t_{on}$ and/or $\Delta t_{off}$ to be zero (no delay), and it is also contemplated to configure $R_{on}$ and/or $R_{off}$ to indicate an instantaneous jump from zero power to maximum power $P_{max}$ or vice versa, for example suitably indicated by setting the ramp to zero. Moreover, the overvoltage response curve of FIG. 3 is merely an illustrative example, and various modifications are contemplated, such as omission of one or both ramps, omission of one or both delays, and so forth.

The use of a given load to alleviate an overvoltage condition presupposes that the load is not already drawing power, so that it is available to be turned on to reduce the voltage. If the load is already drawing power, then the response to the voltage exceeding $V_{on}$ is suitably to increase the power to maximum (if not already at maximum power draw) and to maintain the power draw (at least) until the voltage falls below $V_{off}$. Load availability for overvoltage alleviation also may be contingent on other factors. For example, in the case of a water heater the load may be unavailable for use in alleviating an overvoltage condition if the water temperature is already above its dead band maximum, so that further heating is impermissible. Similarly, if the overvoltage response curve has been invoked and the load is running at maximum power $P_{max}$, the load may be turned off even if the voltage has not fallen below $V_{off}$ if certain conditions(s) are met, such as the water in a water heater raising above the top of the dead band.

Figure 4:
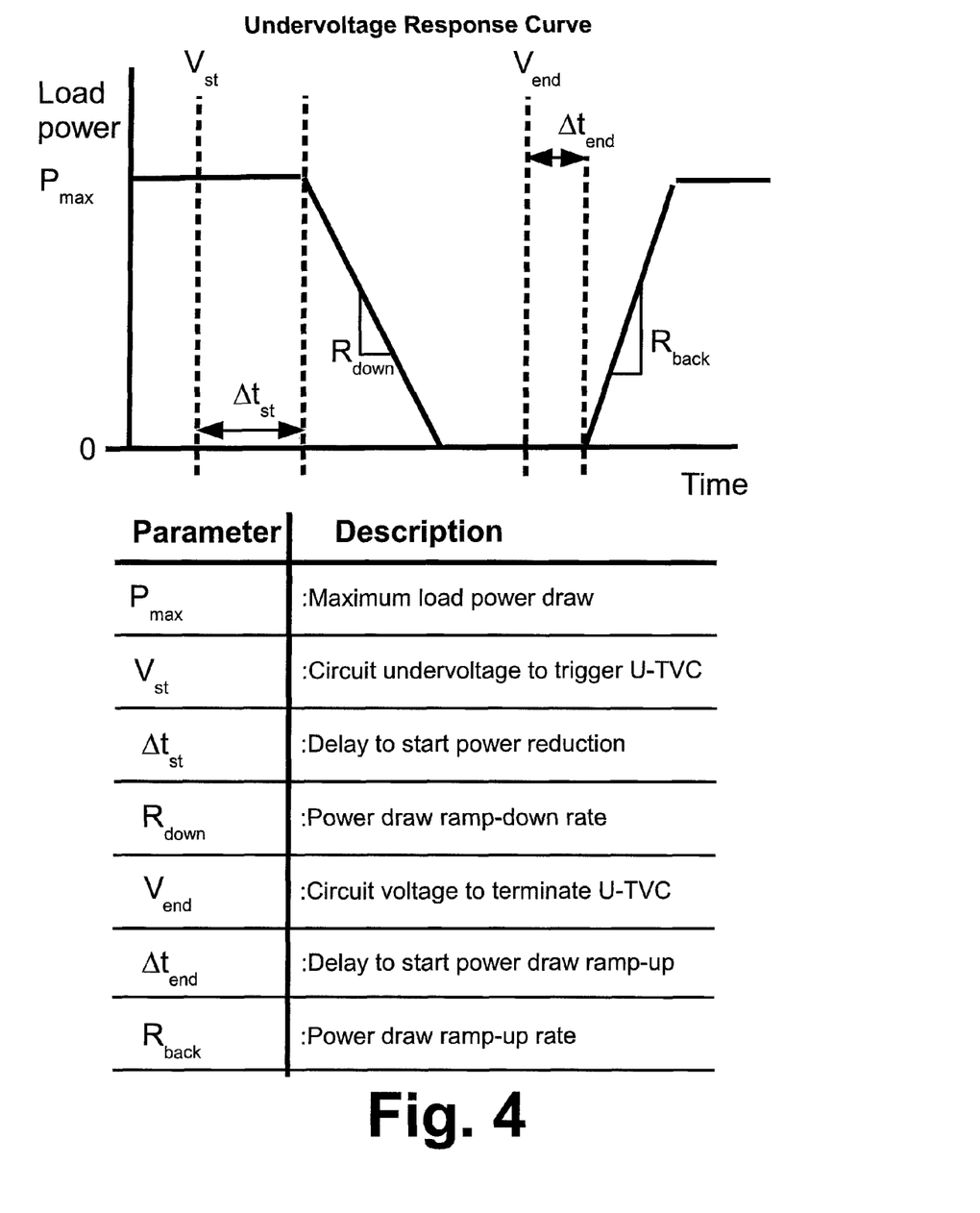
FIG. 4 diagrammatically shows an undervoltage response curve for a load of the power distribution system of FIG. 1.

With reference to FIG. 4, an illustrative embodiment of an undervoltage response curve is shown in the upper portion, with the parameters of the undervoltage response curve tabulated in the lower portion of FIG. 4. The undervoltage response curve is invoked when the circuit voltage (as measured by the voltmeter 24 or received via the communication link 26) falls below a voltage $V_{st}$, which is a configurable parameter of the undervoltage response curve. There is then an optional configurable delay $\Delta t_{st}$ before onset of bringing the load offline (the load is only available to be shed to alleviate the detected undervoltage condition if it is operating at the time), and the load is optionally ramped down at a configurable ramp rate $R_{down}$ until the load reaches zero power (or, in other embodiments, some minimum power, optionally configurable). Thereafter, the load remains in the off condition (drawing no power, or alternatively drawing some minimum power) in order to alleviate the undervoltage condition, until the voltage increases above a voltage level $V_{end}$, which is again a configurable parameter. After an optional configurable delay $\Delta t_{end}$, the power then optionally ramps back up at a configurable ramp rate $R_{back}$. The configurable undervoltage response curve parameters 52 for this embodiment thus include: $V_{st}$, $V_{end}$, $\Delta t_{st}$, $\Delta t_{end}$, $R_{down}$, and $R_{back}$, with the minimum power optionally being a further configurable parameter. It is contemplated to configure $\Delta t_{st}$ and/or $\Delta t_{end}$ to be zero (no delay), and it is also contemplated to configure $R_{down}$ and/or $R_{back}$ to indicate instantaneous load shutdown or vice versa. Moreover, the undervoltage response curve of FIG. 4 is merely an illustrative example, and various modifications are contemplated, such as omission of one or both ramps, omission of one or both delays, and so forth.

The overvoltage response curves (e.g. FIG. 3) and undervoltage response curves (e.g. FIG. 4) are generically referred to herein as "voltage support response curves" or simply "response curves", these terms being equivalent as used herein. In general, each parameterized voltage support response curve includes a trigger voltage parameter (corresponding to $V_{on}$ in the illustrative overvoltage response curve of FIG. 3, and to $V_{st}$ in the illustrative undervoltage response curve of FIG. 4) and a release voltage parameter (corresponding to $V_{off}$ in the illustrative overvoltage response curve of FIG. 3, and to $V_{end}$ in the illustrative undervoltage response curve of FIG. 4). The trigger voltage parameter defines a circuit voltage threshold that triggers execution of the voltage support response curve. More particularly, execution of an overvoltage response curve is triggered when the circuit voltage exceeds the trigger voltage, while execution of an undervoltage response curve is triggered when the circuit voltage falls below the trigger voltage. Each parameterized response curve further includes a release voltage parameter (corresponding to $V_{off}$ in the illustrative overvoltage response curve of FIG. 3, and to $V_{end}$ in the illustrative undervoltage response curve of FIG. 4) that triggers termination of an executing voltage support response curve (where the termination sequence may optionally include a delay, $\Delta t_{off}$ or $\Delta t_{end}$, and/or a ramp-down, $R_{off}$ or $R_{back}$). More particularly, execution of an overvoltage response curve terminates when the circuit voltage falls below the release voltage, while execution of an undervoltage response curve terminates when the circuit voltage rises above the release voltage. The parameterized voltage support response curves optionally include other parameters, such as the illustrative delay ($\Delta t$) and ramp (R) parameters.

The use of a given load to alleviate an undervoltage condition presupposes that the load is already drawing power, so that it is available to be turned off (or to have its power draw reduced to some minimum power) to increase the voltage. If the load is already off, then the response to the voltage falling below $V_{st}$ is suitably to keep the load in its off condition (at least) until the voltage raises up to $V_{end}$. Load availability for undervoltage alleviation also may be contingent on other factors. For example, in the case of a water heater the load may be unavailable for use in alleviating an undervoltage condition if the water temperature is below its dead band minimum, so that the water must be heated.

Figure 5:
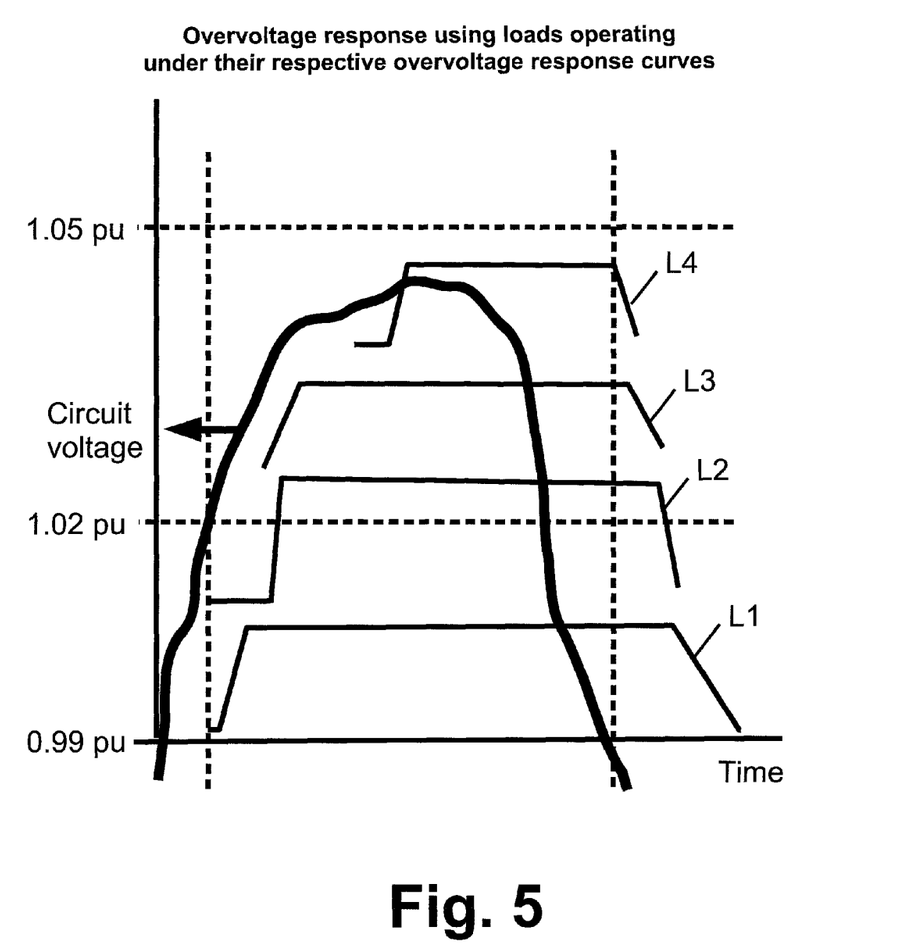
FIG. 5 diagrammatically shows a plurality of loads operating in accordance with their respective overvoltage response curves to collectively remediate an overvoltage excursion.

With reference to FIG. 5, the leveraging of the loads on the distribution circuit to alleviate an overvoltage condition is illustrated. The circuit voltage is plotted in FIG. 5 using a thick solid line, with the left-hand ordinate showing pu voltage values. The overvoltage response is designed to be invoked when the voltage rises above 1.02 pu. However, not all loads immediately enter their respective overvoltage response curves at 1.02 pu. Rather, only those loads configured with $V_{on}$=1.02 pu initially enter their overvoltage response curves. In this case, loads L1 and L2 have $V_{on}$=1.02 pu and hence enter their overvoltage response curves initially. Load L1 is configured with $\Delta t_{on}$=0 and hence begins ramping up its power draw immediately upon the voltage exceeding 1.02 pu. By contrast, load L2 has a non-zero value for $\Delta t_{on}$ and hence its ramp-up is delayed. The aggregation of loads L1 and L2 is therefore a more gradual ramp-up of load draw. If these loads L1 and L2 are sufficient to alleviate the overvoltage condition, then no other loads are invoked.

In illustrative FIG. 5, loads L1 and L2 are not sufficient, and the voltage continues to rise. As the voltage exceeds about 1.03 pu, load L3 which has $V_{on}$=1.03 pu enters its overvoltage response curve with no delay ($\Delta t_{on}$=0). This is still insufficient to alleviate the overvoltage condition, and eventually the configured $V_{on}$ for load L4 is exceeded so as to initiate its overvoltage response curve. The combined power draw of loads L1, L2, L3, and L4 is sufficient to reverse the increasing voltage, and the voltage falls. All four loads L1, L2, L3, and L4 are configured with $V_{off}$=0.99 pu, so that when the falling voltage reaches 0.99 pu all four loads L1, L2, L3, and L4 enter the ramp-down phase of their respective overvoltage response curves. However, they have different configured delays $\Delta t_{off}$ and ramp-down rates $R_{off}$ so that the load decrease is also performed gradually.

The operation for an undervoltage condition is not illustrated, but is analogous to that shown in FIG. 5 for an overvoltage condition. It will be appreciated that the ramping portions of the voltage support response curves add significant complexity to the execution of the response curve by the controller/load, and ramping may be unachievable for some "binary" loads which can only be turned on or off. In the case of distribution circuits with a large number of loads, the aggregate load can be effectively ramped up or down by using small granularity variations in the threshold voltages ($V_{on}$, $V_{off}$, $V_{st}$, $V_{end}$) and/or in the delays ($\Delta t_{on}$, $\Delta t_{off}$, $\Delta t_{st}$, $\Delta t_{end}$), without ramping individual load power draws. Inclusion of the ramping features in the response curves of the individual loads is more useful in the case of distribution circuits with fewer loads.

Figure 6:
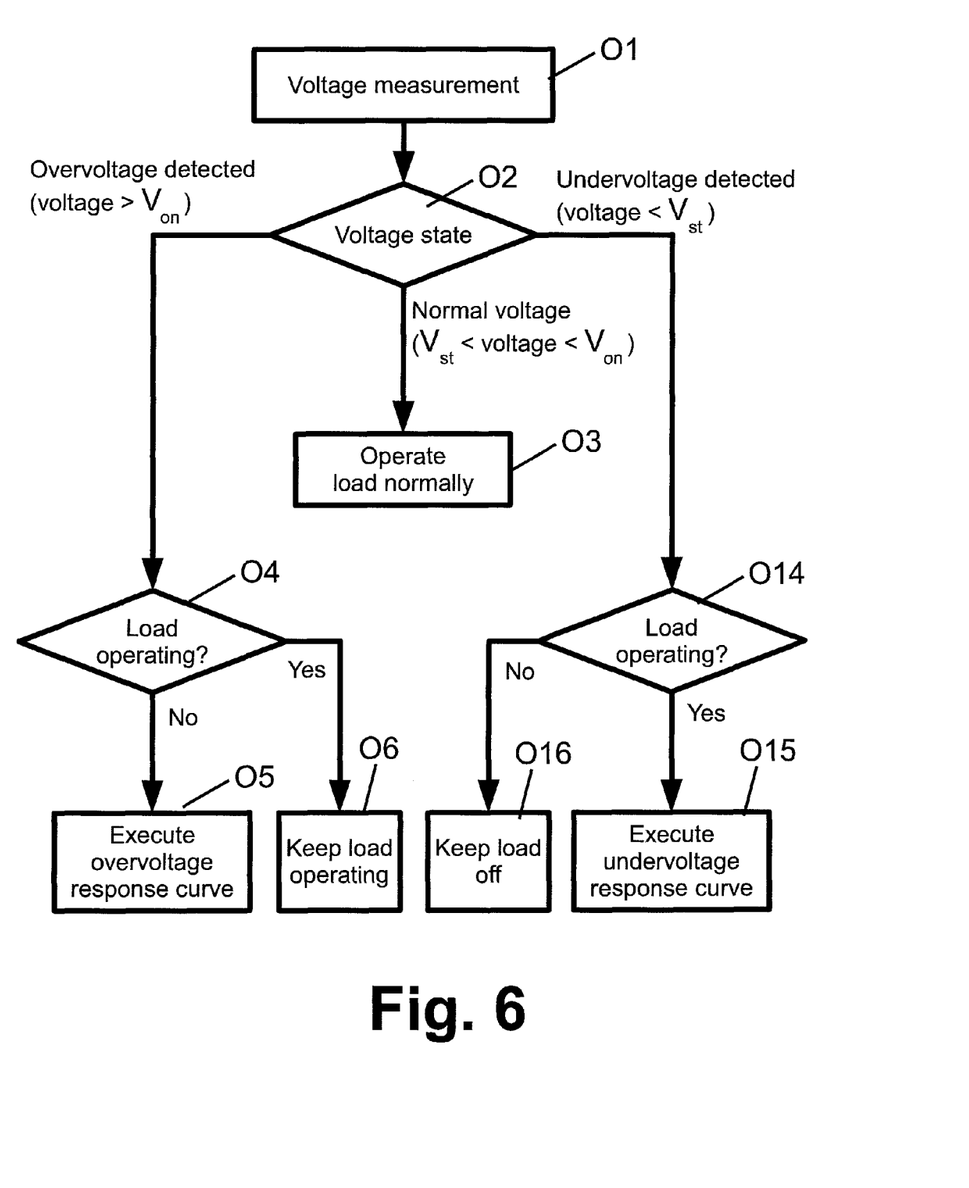
FIG. 6 diagrammatically shows a method suitably performed by the power distribution system of FIG. 1.

With reference to FIG. 6, operation of a load 1 in the voltage support system is described. In an operation O1, the circuit voltage is measured by the voltmeter 24 of the load controller 20, or alternatively the circuit voltage is received at the load controller 20 via the communication link 26. The circuit voltage is a voltage that characterizes the voltage of the distribution circuit and that is used by the load controller 20 as a control input in performing the voltage support. The circuit voltage may, for example, be the voltage at the load (suitably measured by the voltmeter 24), or a voltage at the distribution circuit feeder head (suitably measured by the voltmeter 30 or 40 and conveyed to the load controller 20 via the communication link 26), or an average of the voltages at the loads on the distribution circuit (for example as measured by the respective voltmeters 24 of the load controllers 26 and intercommunicated via the communication links 26 operating in a swarm mode), or so forth. The voltage over the distribution circuit may not be everywhere the same, but in some instances may vary spatially due to factors such as resistive voltage drops along circuit wires, junctions, and so forth. These voltage variations are expected to be small in a well-designed distribution circuit (since resistive losses in wires, at junctions, and so forth represent power losses and decrease efficiency), and moreover changes in voltage at the feeder head should transfer approximately linearly to the various points throughout the distribution circuit (e.g. if the voltage at the feeder head decreases by 10% then a similar 10% voltage decrease should be seen at all points throughout the distribution circuit). Accordingly, various voltage measurements, or swarm averages of voltage measurements, may be suitably employed as the circuit voltage for triggering and releasing execution of overvoltage or undervoltage response curves.

In an operation O2 the voltage state is determined, respective to the voltage $V_{on}(1)$ for invoking the overvoltage response curve of load 1 and respective to the voltage $V_{st}(1)$ for invoking the undervoltage response curve of load 1. If the measured circuit voltage V is in the operational range (that is, $V_{st}(1)<V<V_{on}(1)$), then in operation O3 the load controller 20 operates the load 1 in its normal manner.

On the other hand, if the measured circuit voltage V indicates an overvoltage condition ($V>V_{on}(1)$) then in an operation O4 it is determined whether the load 1 is already operating. If not, then the load 1 is available for use in alleviating the overvoltage condition (assuming other unavailability factors are not in effect) and in an operation O5 the load controller 20 executes the overvoltage response curve of load 1. If the operation O4 determines that the load l is already operating, then it is unavailable for overvoltage alleviation—however, in an operation O6 the load l is kept running, since shutting load l off would further exasperate the overvoltage condition.

If the measured circuit voltage V indicates in operation O2 an undervoltage condition ($V<V_{st}(l)$) then in an operation O14 it is determined whether the load l is already operating. If so, then the load l is available to be shed so as to alleviate the undervoltage condition (assuming other unavailability factors are not in effect) and in an operation O15 the load controller 20 executes the undervoltage response curve of load 1. On the other hand, if the operation O14 determines that the load l is already off, then it is unavailable for undervoltage alleviation—however, in an operation O16 the load l is kept off, since turning on load l off would further exasperate the undervoltage condition.

Selecting the parameters 50, 52 for the voltage support response curves to provide a desired aggregate response to an overvoltage or undervoltage condition (i.e. voltage excursion outside of the normal operating range) entails choosing the parameter values to provide a desired amount of load (or load shedding) as a function of the measured circuit voltage. In the case of overvoltage response curves with no delays and no ramps so that the load turns on when $V>V_{on}$, the power drawn by the aggregation of loads of the distribution circuit for the purpose of alleviating an overvoltage condition as voltage V increases into the overvoltage range is suitably written as:

$$P(V) = \sum_{l \in circuit} \begin{cases} P_{max}(l), & V > V_{on}(l) \text{ and } l \text{ available} \\ 0, & V < V_{on}(l) \text{ and } l \text{ available} \\ 0, & l \text{ unavailable} \end{cases}$$

where l indexes the loads of the distribution circuit. The optimization thus entails choosing the thresholds $V_{on}(l)$ for the loads given the known load power ratings $P_{max}(l)$ of the loads in order to provide the desired aggregate power draw at any given circuit voltage V in the overvoltage range, with the expected number of loads available for alleviating overvoltage being estimated statistically (e.g., based on empirical information on the fraction of water heaters that are not running and not at maximum temperature at any given time). The voltage suppression at circuit voltage V expected for a given power draw P(V) is suitably estimated based on circuit analysis of the distribution circuit using the base equations V=IR and $P(V)=VI=V^2/R$ where I is the current in the distribution circuit and R is the effective resistance of the operating loads on the distribution circuit (both those operating to alleviate the overvoltage condition and any other, normally operating loads) along with any additional lumped or distributed circuit resistances (e.g. the resistance per unit length of the circuit wiring).

The equivalent aggregate power draw shedding to alleviate an undervoltage condition, assuming load undervoltage response curves with no delays and no ramps, can be analogously written as:

$$-P(V) = \sum_{l \in circuit} \begin{cases} -P_{max}(l), & V < V_{st}(l) \text{ and } l \text{ available} \\ 0, & V > V_s(l) \text{ and } l \text{ available} \\ 0, & l \text{ unavailable} \end{cases}$$

where the negative signs indicate power draw shedding. In this expression, it is assumed that all loads that are available for load shedding are initially running at their respective maximum power levels $P_{max}(l)$ prior to being shed, and that all shed loads are turned completely off. If instead the shed loads are reduced to some (load-dependent) minimum power draw $P_{min}(l)$, then the first term can be written as $-(P_{max}(l)-P_{min}(l))$.

The release voltage parameter ($V_{off}$ or $V_{end}$) only affects termination of the executing voltage support response curve, which occurs after the distribution circuit has recovered from the voltage excursion. While it is contemplated to optimize the release voltage, in some embodiments it is alternatively contemplated for the release voltage to be set to the same value for all loads without optimization.

By distributing the trigger voltages for executing the voltage support response curves of the loads l over an expected range of voltage excursions for which voltage support is intended, a greater or lesser fraction of loads can be invoked to provide voltage support depending on the size of the voltage excursion. Moreover, the aggregation of loads responding to provide voltage support to alleviate the voltage excursion (overvoltage or undervoltage condition) is tailored to increase in a desired manner, e.g. linearly, as the circuit voltage V moves further away from the operational range. This provides an elastic response to the voltage excursion: Initially, only a few loads whose trigger voltages are closest to the normal operating range react, but as the voltage excursion increases in magnitude, more loads have their trigger voltages activated and are brought to bear to counter the voltage excursion.

There are various ways of optimizing the parameters 50, 52 of the voltage support response curves, and of controlling execution of the optimized response curves, some of which are described below.

In a local independent learning approach, for which there is no need for central dispatch controller, each device executes its response curves individually. In this approach, each device locally senses voltage using its voltmeter 24 and adjusts its parameters 50, 52 based on the dynamics of voltage observed locally. The loads will typically have some initial configuration of the response curves, and a machine learning algorithm is applied based on the feeder location and load/DER dynamics. The response curves are suitably adjusted based on the number of voltage excursions observed, as well as the adjustments observed. For example, if the load controller 20 observes excessive device cycling, oscillations or over-corrections in voltages, it suitably increases the times to respond for a particular set of voltage observations. On the other hand, if the voltage corrections are too slow/small, the response curves are suitably locally adjusted to respond more quickly to voltage excursions. This approach can also allow for remote updates/re-tuning as necessary. The amount of communication for this approach is minimal—for example, the illustrative communication media 34, 44 (see FIG. 1) are optionally omitted entirely in these embodiments.

Another illustrative approach employs feeder-level learning and monitoring. This method suitably utilizes the circuit controllers 32, 42 of FIG. 1 which reside (virtually or physically) at the circuit/feeder level and monitor voltages at selected points across the circuit, for example using the illustrative voltmeters 30, 40 and optionally additional voltmeters (not shown) further downstream. The dispatch controller 32, 42 dynamically updates the response curves for each load as needed. This update can be based on changing load/DER conditions, circuit reconfigurations, or changing system objectives (e.g. VVO vs simple voltage support). The dispatch controller 32, 42 updates the response curves periodically, and the loads automatically respond to local voltages based on the updated response curves.

In another illustrative approach, a swarm mechanism is employed. This approach employs communication between loads, optionally without the central controllers 32, 42, to coordinate their autonomous updates of the response curves. Each load suitably receives information (e.g. voltage, response curve settings) from other loads on the same distribution circuit and uses that information to adjust its own overvoltage and undervoltage response curves.

As yet another illustrative example, a centralized approach includes incorporation into a VVO scheme. This approach is similar to the feeder-level approach, but integrates the dispatch with higher level functions, such as VVO and/or feeder reconfiguration to tailor the response curve updates to meet optimization objectives in addition to managing voltage within the regulatory ranges.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A system comprising:
   electricity consuming loads;
   a distribution circuit connected with the loads to deliver electricity from a feeder head of the distribution circuit to the loads; and
   load controllers connected with respective loads, each load controller comprising a microprocessor or microcontroller programmed to (1) operate the connected load and (2) cause the load to execute a voltage support response curve of power draw versus time in response to a circuit voltage excursion outside of a normal operating circuit voltage range;
   wherein each voltage support response curve has parameters including at least (1) a trigger voltage defining a circuit voltage threshold that triggers execution of the voltage support response curve and (2) a release voltage defining a circuit voltage threshold that terminates execution of the voltage support response curve.

2. The system of claim 1 wherein the trigger voltages of the voltage support response curves of the load controllers are different for different load controllers.

3. The system of claim 1 wherein the trigger voltages of the voltage support response curves of the load controllers are different for different load controllers and configured to add increasing aggregate load providing voltage support as the circuit voltage excursion increases in magnitude.

4. The system of claim 1 wherein the voltage support response curve comprises an overvoltage response curve in which:
   execution of the overvoltage response curve is triggered when the circuit voltage rises above the trigger voltage,
   execution of the overvoltage response curve causes the load to turn on or increase power draw, and
   execution of the overvoltage response curve is terminated when the circuit voltage falls below the release voltage.

5. The system of claim 1 wherein the voltage support response curve comprises an undervoltage response curve in which:
   execution of the undervoltage response curve is triggered when the circuit voltage falls below the trigger voltage,
   execution of the undervoltage response curve causes the load to turn off or reduce power draw, and
   execution of the undervoltage response curve is terminated when the circuit voltage rises above the release voltage.

6. The system of claim 1 wherein the voltage support response curve includes a load power draw ramp.

7. The system of claim 1 wherein the termination of the executing voltage support response curve includes ramping load power draw.

8. The system of claim 1 wherein each load controller further includes a voltmeter that measures the circuit voltage.

9. The system of claim 8 wherein each load controller is programmed to perform a machine learning algorithm based at least on circuit voltage history to optimize parameters of the voltage support response curve including at least the trigger voltage.

10. The system of claim 1 further comprising:
    a communication link configured to communicate measurements of the circuit voltage to the load controllers.

11. The system of claim 10 further comprising:
    a voltmeter configured to measure the circuit voltage at the feeder head of the distribution circuit, the communication link communicating the measurements of the circuit voltage at the feeder head to the load controllers.

12. The system of claim 11 further comprising:
    a circuit controller comprising an electronic data processing device configured to perform a machine learning algorithm based at least on circuit voltage history to optimize parameters of the voltage support response curves of the load controllers including at least the trigger voltages.

13. The system of claim 1 wherein:
    the distribution circuit is one of a three-phase distribution circuit and a single-phase distribution circuit.

14. The system of claim 1 wherein the loads include at least one of water heaters, air conditioners, and dishwashers.

15. A method comprising:
    operating loads on a distribution circuit wherein the operating causes the loads to consume electricity delivered to the loads via the distribution circuit;
    measuring a circuit voltage of the distribution circuit; and
    responding to an excursion of the measured circuit voltage outside of a normal operating voltage range by triggering a sub-set of the loads on the distribution circuit to increase or decrease their power draw to counter the excursion.

16. The method of claim 15 wherein the excursion comprises an overvoltage condition and the responding comprises:
    triggering a sub-set of the loads on the distribution circuit to operate in order to reduce the circuit voltage.

17. The method of claim 15 wherein the excursion comprises an overvoltage condition and the responding comprises:
    triggering a sub-set of the loads on the distribution circuit to increase their power draw in order to reduce the circuit voltage.

18. The method of claim 15 wherein the excursion comprises an undervoltage condition and the responding comprises:
    triggering a sub-set of the loads on the distribution circuit to cease operating in order to increase the circuit voltage.

19. The method of claim 15 wherein the excursion comprises an undervoltage condition and the responding comprises:

triggering a sub-set of the loads on the distribution circuit to reduce their power draw in order to increase the circuit voltage.

20. The method of claim 15 wherein:

the operating comprises using load controllers of the loads to operate the loads; and the responding comprises triggering the load controllers of the sub-set of the loads to execute voltage support response curves in accordance with parameters of the voltage support response curves stored at the respective load controllers to cause the loads of the sub-set to increase or decrease their power draw as a function of time to counter the excursion.

21. The method of claim 20 wherein the parameters include a voltage trigger parameter defining a circuit voltage threshold triggering execution of the voltage support response curve, and the different load controllers store different values of the voltage trigger parameter whereby the responding includes increasing the sub-set as the voltage excursion increases in magnitude.

* * * * *